(12) United States Patent
Maznev et al.

(10) Patent No.: US 6,204,926 B1
(45) Date of Patent: Mar. 20, 2001

(54) METHODS AND SYSTEM FOR OPTICALLY CORRELATING ULTRASHORT OPTICAL WAVEFORMS

(75) Inventors: Alexi A. Maznev, Natick; Timothy F. Crimmins, Cambridge; Keith A. Nelson, Newton, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/352,964

(22) Filed: Jul. 14, 1999

Related U.S. Application Data
(60) Provisional application No. 60/092,688, filed on Jul. 14, 1998.

(51) Int. Cl.⁷ .................................................. G41B 9/02
(52) U.S. Cl. ........................ 356/521; 356/499; 356/494; 356/488
(58) Field of Search .................................. 356/345, 351, 356/349

(56) References Cited

U.S. PATENT DOCUMENTS 5,734,470 3/1998 Rogers et al. .
6,043,886 * 3/2000 Bruning ........................... 356/354

OTHER PUBLICATIONS

Ippen et al, "Dynamic Spectroscopy and Subpicosecond Pulse Compression.", Applied Physics Letters, p. 488–490, Nov. 1975.*

Rogers et al., "Optical System for Rapid Materials Characterization with the Transient Grating Technique: Application to Nondestructive Evaluation of Thin Films Used in Microelectronics," *Appl. Phys. Lett.* 71:225–227, Jul. 14, 1997.

* cited by examiner

*Primary Examiner*—Robert Kim
(74) *Attorney, Agent, or Firm*—Fish & Richardson P.C.

(57) ABSTRACT

The invention features methods and systems for optical correlation of ultrashort optical waveforms, e.g., pulses. The optical waveform passes through a diffractive optic, e.g., a mask or grating, to generate multiple sub-beams corresponding to different diffractive orders. At least two of the sub-beams are then imaged onto the sample to produce a desired crossing pattern. To perform the correlation, the diffracted sub-beams are variably delayed relative to one another prior to overlapping on the sample. The sample generates a signal beam in response to the overlapping sub-beams, the signal beam providing a correlation between the sub-beams for each of the variable delays.

22 Claims, 4 Drawing Sheets

METHODS AND SYSTEM FOR OPTICALLY CORRELATING ULTRASHORT OPTICAL WAVEFORMS

CROSS-REFERENCE TO RELATED APPLICATIONS

This application claims the benefit of U.S. Provisional Application No. 60/092,688, filed Jul. 14, 1998, the contents of which are incorporated herein by reference.

STATEMENT AS TO FEDERALLY SPONSORED RESEARCH

This invention was made with government support under Grant Number CHE-9713388 awarded by the National Science Foundation. The government has certain rights in the invention.

BACKGROUND OF THE INVENTION

The invention relates to optical correlation techniques for characterizing materials and optical waveforms.

Modern laser technology permits the routine generation of ultrashort optical pulses, i.e., pulses having a duration of less than about 1 psec. Some lasers can even generate pulses as short as about 10 fsec. More generally, modern laser systems can produce ultrafast optical waveforms that have features as short as ultrafast pulses, e.g., a terahertz train of ultrashort pulses. See, e.g., U.S. Pat. Nos. 5,682,262 and 5,719,650. Such ultrashort waveforms (including single pulse waveforms) can be used to probe chemical and physical phenomena in atoms, molecules, and materials. Unfortunately, the time scales for such measurements and for the optical waveforms themselves exceed the bandwidth of most, if not all, electronic detectors. As a result, many measurements involve optical correlation techniques in which two or more waveforms overlap on a sample or non-linear optical crystal.

SUMMARY OF THE INVENTION

The invention features methods and systems for optical correlation of ultrashort optical waveforms, e.g., pulses. The optical waveform passes through a diffractive optic, e.g., a mask or grating, to generate multiple sub-beams corresponding to different diffractive orders. At least two of the sub-beams are then imaged onto the sample to produce a desired crossing pattern. To perform the correlation, the diffracted sub-beams are variably delayed relative to one another prior to overlapping on the sample. The sample generates a signal beam in response to the overlapping sub-beams, the signal beam providing a correlation between the sub-beams for each of the variable delays.

In general, in one aspect, the invention features a method for autocorrelating an optical waveform. The method includes: passing an input beam containing the optical waveform through a diffractive mask to form at least two sub-beams; delaying one of the sub-beams relative to the other sub-beam; and imaging the two sub-beams onto a non-linear optical crystal to allow the two sub-beams to spatially overlap with one another. The diffractive mask defines the object plane and the non-linear optical crystal defines the image plane. The overlapping sub-beams are delayed relative to one another, and the non-linear optical crystal generates a signal beam in response to the overlapping sub-beams.

The method can include any of the following features. The method can further include measuring the intensity of the signal beam and repeating the measuring step for each of multiple delays between the sub-beams. The method can further include spectrally resolving the signal beam and measuring the intensity of the spectrally resolved signal beam, and repeating the resolving and measuring steps for each of multiple delays between the sub-beams. The non-linear optical crystal can generate the signal beam by second harmonic generation or by any other non-linear optical mechanism. The delaying step can include introducing material into a path of one of the sub-beams. The imaging step can include passing the sub-beams through a pair of lenses. The optical waveform can have temporal features shorter than about 1 psec, shorter than about 300 fsec, or even shorter than about 50 fsec. The optical waveform can be an optical pulse. The two sub-beams can correspond to different orders of diffraction for the diffractive mask.

In general, in another aspect, the invention features an optical autocorrelator for characterizing an an optical waveform. The autocorrelator includes: a diffractive mask which during operation diffracts an input beam carrying the optical waveform into at least two sub-beams; an optical delay assembly positioned in the path of a first of the two sub-beams, wherein during operation the optical assembly introduces a variable delay between the two sub-beams; a non-linear optical crystal; an optical imaging system which during operation images the two sub-beams onto the non-linear optical crystal to allow the two sub-beams to spatially overlap one another, the diffractive mask defining a object plane and the non-linear optical crystal defining the image plane; and an analyzer which during operation measures an intensity of a signal beam produced by the non-linear optical crystal in response to the two overlapping sub-beams.

The autocorrelator can include any of the following features. The autocorrelator can further include a controller connected to the optical delay assembly and the analyzer, wherein during operation the controller causes the optical delay assembly to introduce multiple delays between the two sub-beams and records the intensity of the signal beam for each of the multiple delays. The optical delay assembly can include an optical window positioned in the path of the first sub-beam and a rotation stage supporting and adjustably orienting the optical window, the adjustable orientation of the optical window defining the variable delay between the two sub-beams. The autocorrelator can further include a stationary optical window positioned in the path of the second of the two sub-beams to impart a fixed delay to the second sub-beam. The analyzer can include a grating and a multi-element photodetector, wherein during operation the grating spectrally resolves the signal beam on the photodetector and the photodetector records the spectrally resolved intensity of the signal beam. Alternatively, the analyzer can be a photodetector. The non-linear optical crystal can generate the signal beam by second harmonic generation or by any other non-linear optical technique. The optical imaging system can include a pair of lenses and the optical delay assembly can be positioned between the pair of lenses. Each of the pair of lenses can be a spherical lens. The two sub-beams can correspond to different orders of diffraction for the diffractive mask.

Embodiments of the invention include many advantages. For example, the correlation technique optimizes the overlap of the two sub-beams on the sample (e.g., the non-linear crystal) and thereby greatly simplifies alignment and robustness of the optical correlation system.

Other features, aspects, and advantages follow.

DETAILED DESCRIPTION

Crossing Ultrashort Pulses

In many applications, ultrashort optical pulses, e.g., pulses on the order of 100 fs, crossed at nonzero angle overlap only over a small region in space. This limitation can be overcome by using diffraction orders of a grating. We consider the arrangement in which, upon diffraction of a femtosecond pulse by a grating, two beams corresponding to the first-order diffraction maxima are recombined at the image plane by a system of two confocal lenses. In this arrangement, the beams overlap over the their full aperture with the short duration of the pulses being preserved.

Figure 1A:
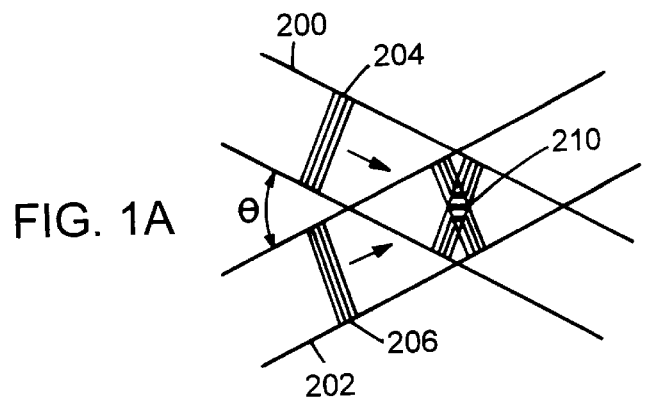
FIGS. 1a and 1b are schematic diagrams of overlapping femtosecond beams (a) crossed at an angle to one another and (b) crossed using a diffraction grating G and confocal imaging system $L_1$ and $L_2$.

Various ultrafast optical techniques involve crossing of two or more femtosecond pulses in a medium. Referring to FIG. 1a, beams 200 and 202 including pulses 204 and 206, respectively, can be crossed with one another using beam-splitters and mirrors. However, the shorter the pulses, the smaller the area 210 over which the pulses overlap. For two beams crossed at the angle θ, the size of the overlap area is given by $c\pi/\sin(\theta/2)$, where c is the speed of light in the medium, and π is the pulse duration. For example, for a 30 fs pulse duration and a moderate angle such as 5° the beams overlap only within a strip approximately 200 microns wide. The number of interference fringes produced by two beams is independent of the angle and, for transform-limited pulses, is roughly $2c\pi/\lambda$, where λ is the optical wavelength. With 30 fs pulses at λ=800 nm, only about 20 interference fringes can be produced.

Figure 1B:
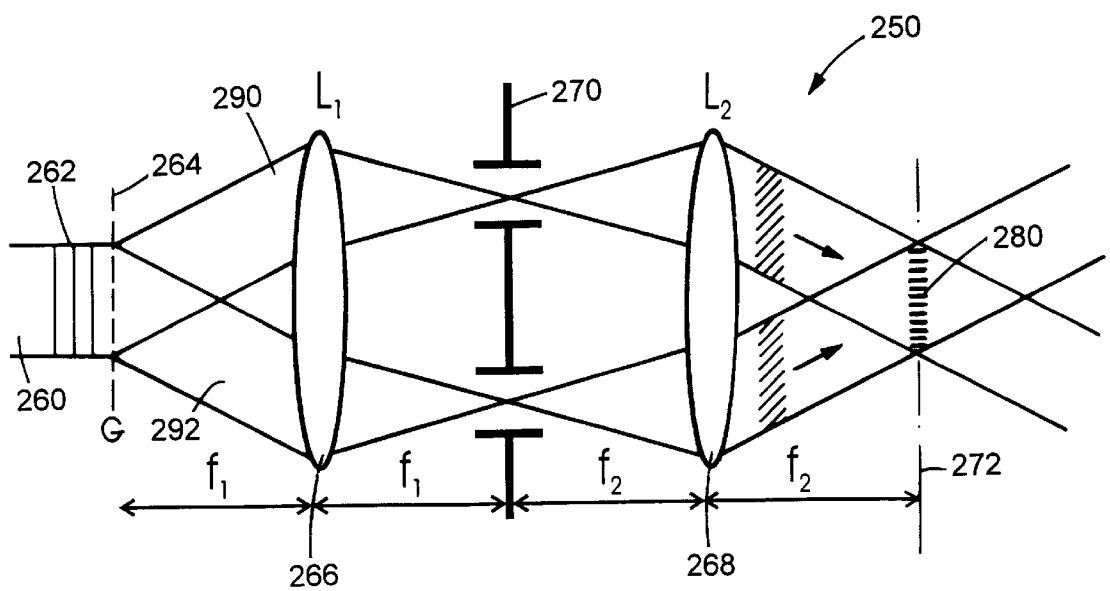
Figure 2A:
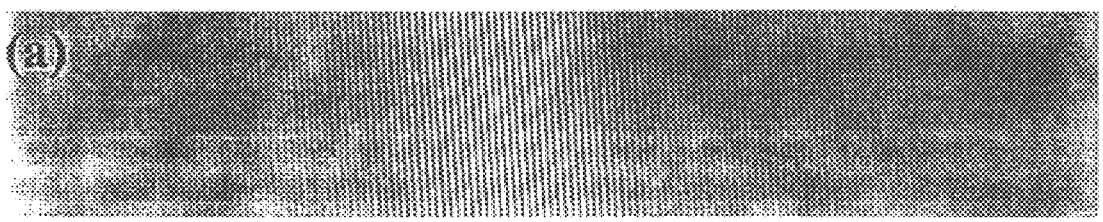
FIGS. 2a and 2b are CCD images of the interference patterns produced by two overlapping 30 fs pulses corresponding to the arrangements of FIGS. 1a and 1b, respectively.
Figure 2B:
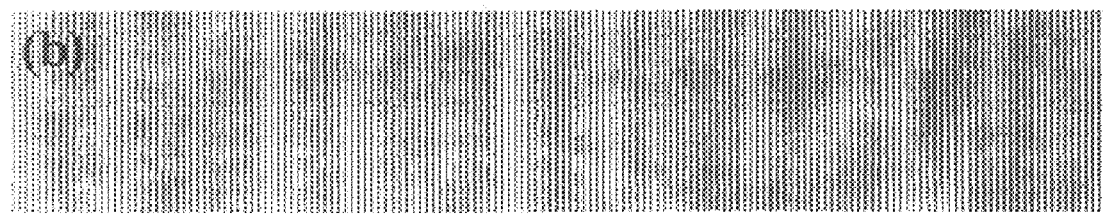

These limitations can be overcome if we cross diffraction orders of a grating using system 250 shown in FIG. 1b. Pulses corresponding to different diffraction orders propagate at different angles and have parallel pulse fronts. In system 250, a beam 260 containing femtosecond pulse 262 is transmitted through a diffraction grating 264 to form at least two sub-beams 290 and 292, corresponding to the first diffraction orders. The sub-beams are imaged by two confocal lenses $L_1$ and $L_2$ or other suitable optics, e.g., reflective optics, with grating 264 being placed in the front focal plane of the first lens. The lenses have focal lengths $f_1$ and $f_2$, respectively, and are denoted by reference numerals 266 and 268, respectively. A spatial filter 270 transmits the two sub-beams and blocks other sub-beams corresponding to different orders of diffraction. The sub-beams are then recombined at image plane I (denoted by reference numeral 272). System 250 not only provides pulse overlap in the image plane I, but also preserves short pulse duration.

Let us assume that the incident pulse in FIG. 1b is transform-limited with a Gaussian temporal profile, and that the polarization is perpendicular to the plane of the drawing. The electric field of the incident beam is given by:

$$E=E_0\exp[-(t-z/c)^2/\tau_0^2]\exp[i\omega_0(t-z/c)]=$$

$$=(E_0\tau_0/2\pi^{1/2})\exp[-(\omega-\omega_0)^2\tau_0^2/4]\exp[i\omega(t-z/c)]d\omega \quad (1)$$

where $\omega_0$ is the central frequency of light, $\tau_0$ is related to the FWHM pulse duration τ by $\tau_0=\tau(2*\ln 2)^{1/2}$ and the distance z is measured from the front focal plane of the lens L1. Consider one of the plane waves, comprising the integral in Eq. (1), in which the electric field is given by $\exp[i\omega(t-z/c)]$. Upon diffraction of this plane wave by the grating, a wave diffracted into the nth order is given by $$E_n(\omega)=A_n\exp[i\omega t-i(\omega^2/c^2-q_n^2)^{1/2}z-iq_nx], \quad (2)$$

where x is the vertical coordinate measured, e.g., from the optical axis, $q_n$ is the diffraction wave vector expressed through the grating period Λ by $q_n=2\pi n/\Lambda$, and $A_n$ is the complex amplitude which depends on whether the grating is a phase or amplitude one and on the grating profile (we assume a symmetric grating so that $A_n=A_{-n}$). For a phase grating, $A_n$ is ω-dependent, but for a small frequency spread, e.g., $\delta\omega/\omega_0<<1$, this dependence is weak and can be ignored. For embodiments in which this condition is not met, amplitude gratings may be preferable.

Disregarding diffraction by the lens system, the plane wave in Eq. (2) will be transformed by the imaging system into a plane wave $$E_n(\omega)=A_n\exp[i\omega t-i(\omega^2/c^2-q_n^2)^{1/2}z'+i(q_n/M)x-iL\omega/c], \quad (3)$$

where the distance z' is measured now from the image plane, $M=f_2/f_1$ is the magnification factor of the imaging system, and an additional phase term $L\omega/c$ is due to the optical path L from the point (x=0, z=0) to its image at (x=0, z'=0). The electric field yielded by the nth-order diffraction at the output of the imaging system is given by the superposition of plane waves, $$E_n=(E_0\tau_0/2\pi^{1/2})A_n\exp(iq_nx/M)\int d\omega\exp[-(\omega-\omega_0)^2\tau_0^2/4]\times\exp[i\omega t'-i(\omega^2/c^2-q_n^2/M^2)^{1/2}z'] \quad (4)$$

where $t'=t-L\omega/c$.

The integral in Eq. (4) is independent of x. Therefore, the planes of equal amplitude in a pulse are parallel to the plane z'=0. Assuming a small frequency spread, $\delta\omega/\omega_0<<1$, and small angles, $q_n/M<<\omega^2/c^2$, one gets the following result for the duration of the pulse:

$$\tau=\left(\tau_0^2+z'^2\frac{4c^2q_n^4}{M^4\omega_0^6\tau_0^2}\right)^{1/2}, \quad (5)$$

i.e., the pulses are compressed to the original duration $\tau_0$ as they approach the image plane.

Exactly in the image plane z'=0, the electric field given by the two beams corresponding to ±1 orders of diffraction is given by $$E=2A_1E_0\cos(q_1x/M)\exp(-t'^2/\tau_0^2)\exp(i\omega_0t'). \quad (6)$$

The interference pattern with the period MΛ/2 extends over the entire image plane. Thus we have two pulses overlapping in the image plane over the area limited only by the aperture of the optical system.

In terms of the space-time picture, the full overlap 280 results from the tilted pulse fronts as shown in FIG. 1b. In terms of spectral components, a diffracted beam consists of components with different wave vector directions. However, the x-component of the wave vector is the same for all the spectral components. Therefore, when the two beams are crossed, the difference in the x-component of the wavevector $\Delta k_x=2q_1/M$ is well defined, resulting in a well-defined periodic interference pattern.

In an experiment, we used 30 fs pulses of an amplified Ti:sapphire system at λ=800 nm and compared the beams crossing with a beamsplitter and mirrors as in FIG. 1a, and that of FIG. 1b. In the latter case, we used a phase grating with the period λ=10 microns, and two spherical lenses with focal lengths 15 cm. FIG. 1c shows the interference pattern produced by crossing the beams as in FIG. 1a, which contains, as expected, only about 20 high-contrast interference fringes. In contrast, the grating set-up of FIG. 1b resulted in a fringe pattern spreading all over the laser spot. A portion of this pattern is shown in FIG. 1d.

The arrangement shown in FIG. 1b makes it possible for the femtosecond pulses to overlap in time and space over the full aperture of the beams. Although in the arrangement considered here, the two beams were obtained from a single one, a similar arrangement can be used to optimize the overlap of two beams of different wavelength or polarizations. The techniques has many advantages. One obvious advantage is that the signal in wave mixing measurements can be collected from a larger area, which should be helpful if the signal is weak and the excitation intensity is limited by the damage threshold of the medium. A more fundamental issue is accurate definition of $\Delta k_x$ for propagating material excitations. To be specific, let us consider impulsive stimulated Raman scattering on phonon-polaritons, where two crossed beams are used to excite phonon polariton modes at the wavevectors equal to $+/-\Delta k_x$, and the resulting standing wave is detected via diffraction of a probe pulse. By crossing pulses as in FIG. 1a, one can only produce a limited number of polariton periods, equal to the number of the interference fringes. Consequently, the signal due to the standing wave dies out as the counter-propagating waves leave the excitation region, making it difficult to accurately measure the polariton frequency, attenuation, and nonlinear effects. Using the grating arrangement of FIG. 1b to produce an unlimited number of interference fringes would be advantageous for this and other experimental techniques using ultrashort pulses to excite propagating material excitations.

The system can also be easily adapted to correlate the two sub-beams with one another by introducing a variable delay between the two sub-beams. For example, substantially transparent optical material positioned between lenses 266 and 268 along the path of one of the sub-beams would introducing extra optical path length to one of the sub-beams.

Optical Autocorrelator

Figure 3:
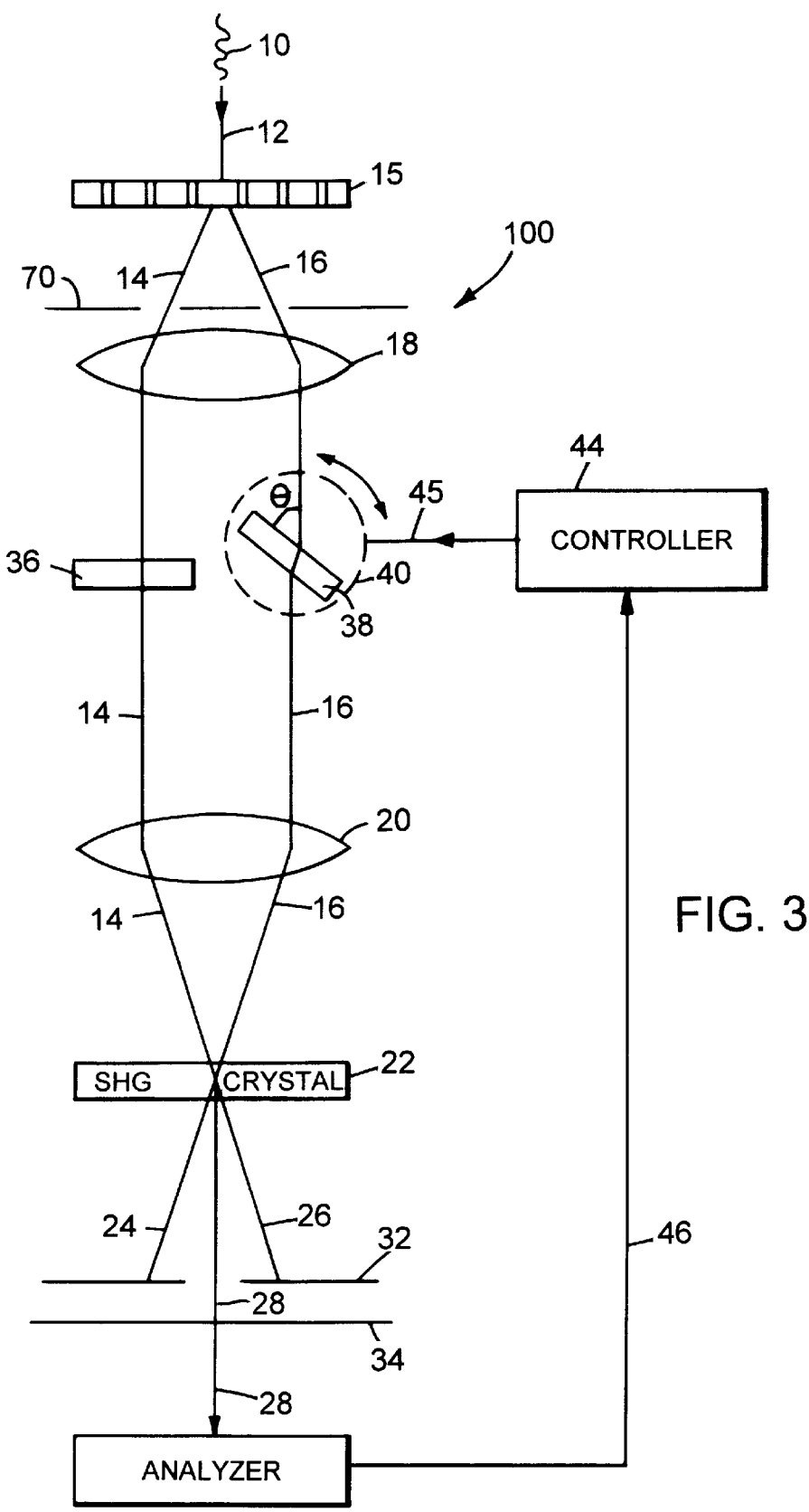
FIG. 3 is a schematic of an optical autocorrelator based on the beam crossing technique of FIG. 1b.

The techniques described above can be used in an optical autocorrelator for characterizing ultrashort optical waveforms, e.g., measuring the pulse duration of ultrashort optical pulse. FIG. 3 illustrates a schematic for such an autocorrelator 100.

An ultrashort optical beam 12 containing optical waveform 10 is incident on a diffractive optic 15 that diffracts beam 12 into at least two orders, e.g., diffracted order +1 and −1, to form diffracted beams 14 and 16. Diffractive optic 15 can be a mask or grating that imparts amplitude modulation, phase modulation, or both, and which may be reflective or transmissive. Suitable diffractive optics are described, e.g., in U.S. Pat. No. 5,734,470, the contents of which is incorporated by reference.

A pair of lenses 18 and 20 image the profile of diffracted beams 14 and 16 immediately after diffractive optic 15 onto a non-linear optical crystal 22, e.g., a crystal of $LiTaO_3$, $LiNbO_3$, KTP, or KDP. Thus, as described above, the diffracted beams 14 and 16 spatially overlap completely in the plane of non-linear optical crystal 22, i.e., the image plane defined by lenses 18 and 20, without any loss of temporal resolution. Thus, the autocorrelator is substantially alignment-free.

The non-linear optical crystal generates the second harmonic of diffracted beams 14 and 16, which exit the crystal as beams 24 and 26, respectively. In addition, the non-linear crystal generates a second harmonic signal beam 28 having an intensity proportional to the temporal and spatial overlap of beams 14 and 16 in crystal 22. An analyzer 30, e.g., a photodiode, measures the intensity of signal beam 28. A spatial filter 32 and a spectral filter 34 prevent beams 24 and 26 and scattered fundamental light, respectively, from reaching analyzer 30. In other embodiments, non-linear mechanisms different from second harmonic generation can be used. For example, non-linear optical crystal 22 may generate a signal beam for spatially and temporally overlapping beams 14 and 16 based on, e.g., self-diffraction, polarization rotation, or difference-frequency mixing. As described above, use of diffractive element 15 increases the overlap of beams 14 and 16 relative to conventional beam crossing, so the signal beam 28 is stronger, thereby increasing the sensitivity of the autocorrelator.

Identical glass slides 36 and 38 are positioned between lenses 18 and 20 to receive and transmit diffracted beams 14 and 16, respectively. Slide 36 is fixed normal to beam 14 and slide 38 is mounted on a motorized rotation stage 40, which allows beam 16 to intersect slide 38 over a range of incident angles θ. When beam 16 is normal to slide 38, i.e., θ=90°, beams 14 and 16 temporally overlap completely and maximize the intensity of signal beam 28 generated by crystal 22. As the angle θ differs from θ=90°, beam 16 travels through a path length in slide 38 that is larger than that of beam 14 in slide 36. Thus, beam 16 is delayed relative to beam 14 and their temporal overlap in crystal 22 decreases, thereby reducing the intensity of signal beam 28. For example, for glass slide 38 having a thickness of about 150 microns and being oriented at angle θ of about 27°, the delay is about 20 fs. Larger delays can be achieved by increase the difference angle θ from 90° or using thicker slides. The precise delay between the two beams can be determined from their difference in optical path length. Furthermore, since glass slide 38 has substantially parallel faces, the direction of beam 16 is unaffected by slide 38. Thus, beams 14 and 16 spatially overlap completely in the plane of crystal 22 over the range of angles for θ.

To scan through a range of delays, a controller 44 rotates rotation stage 40 using a drive signal 45. At the same time, controller 44 receives a signal 46 from analyzer 30 indicative of the intensity of signal beam 28. Controller 44 records an autocorrelation of input beam 12 by monitoring signal 46 as a function of the drive signal 45, which can be converted to a delay time between beams 14 and 16. For example, assuming waveform 10 has an intensity profile I(t) then the correlation signal S(τ) is proportional to the integral of I(t)I(t+τ), where τ is the delay time between the two beams and the integral is taken over all times t.

Figure 4:
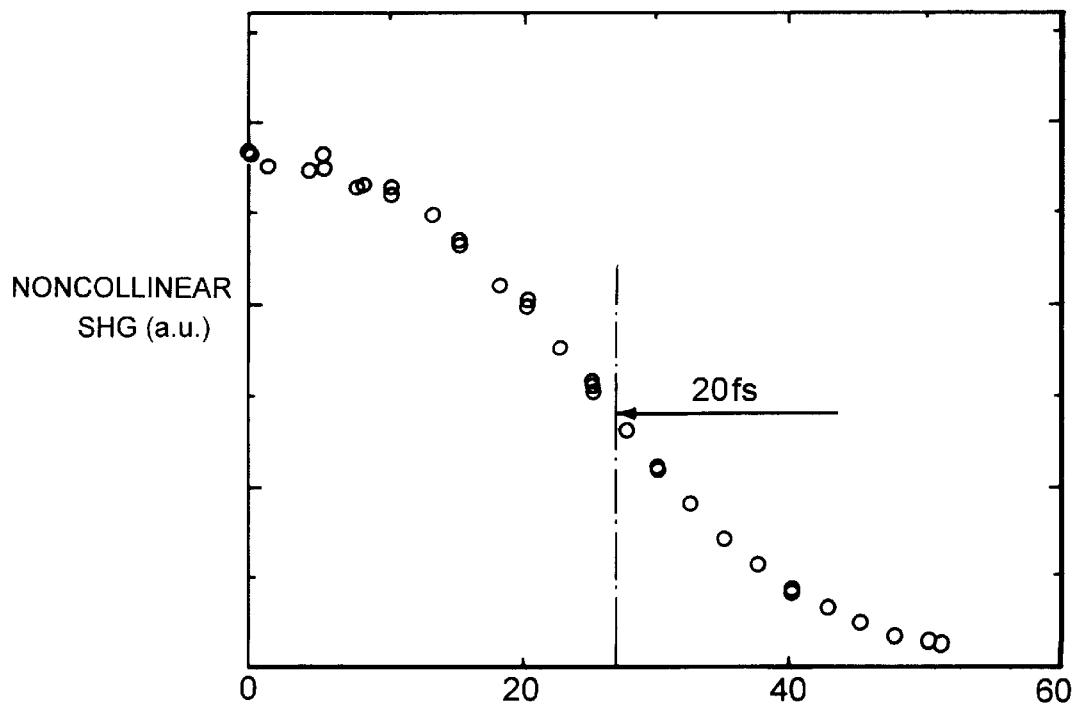
FIG. 4 is an autocorrelation curve obtained by rotating a 150 micron glass slide in one arm of the autocorrelator of FIG. 3 and monitoring the noncollinear SHG output versus the rotation angle.

FIG. 4 illustrates an autocorrelation of a 30 fs, 800 nm pulse from a Ti:sapphire laser system recorded using the autocorrelator described herein, except that glass slide 38, which was 150 microns thick, was rotated manually.

Referring again to FIG. 3, autocorrelator 100 can also include a mask 70 positioned before lens 18 for transmitting sub-beams corresponding to selected orders of diffraction, e.g., −1 and +1, and blocking other orders of diffraction. In addition, where optical waveform 10 includes multiple, well-separated frequencies, e.g., $\omega_1$, and $\omega_2$, mask 70 can be used to select among the different wavelengths of the sub-beams. For example, mask 70 could select the +1 order for $\omega_1$ and the −1 order for $\omega_2$. In this case, the correlation signal $S(\tau)$ would no longer be an autocorrelation of $I(t)$, but a correlation between the $\omega_1$ component of $I(t)$ and the $\omega_2$ component of $I(t)$. Mask 70 can also be positioned between lenses 18 and 20, or between lens 20 and non-linear crystal 22.

Figure 5:
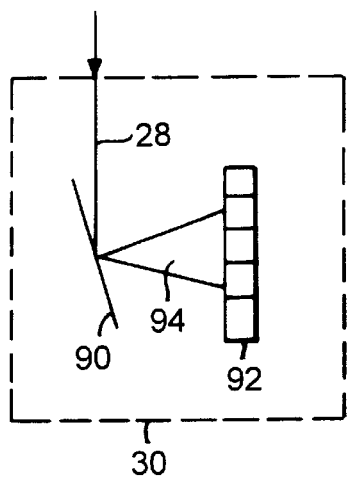
FIG. 5 is a schematic diagram of an analyzer for spectrally resolving a correlation signal beam.

As shown in FIG. 5, analyzer 30 can include a grating 90 that diffracts signal beam 28 into its spectral components 94 and directs them to a multielement detector 92, which records the intensities of the spectral components 94. If necessary, imaging optics can be positioned between grating 90 and multielement detector 92. Measuring a correlation signal beam as a function of both delay and spectral frequency can provide additional information about waveform 10, see, e.g., R. Trebino and D. J. Kane in *J. Opt. Soc. Am.*, A10:1101 (1993). Alternatively, analyzer 30 can be a single-element detector, which measures the intensity of all spectral components of the signal beam.

Also, in other embodiments, slide 36, like slide 38, can be supported by a motorized rotation stage and oriented under the control of controller 44 so that both positive and negative delays can be introduced between beams 14 and 16. Alternatively, slide 36 can retain a fixed orientation at a non-normal offset angle or can be thicker than slide 38 so that beam 16 precedes beam 14 for $\theta=90\theta$ and follows beam 14 for other angles, e.g., angles less than 60°. Furthermore, in other embodiments, other means for introducing a delay between beams 14 and 16 can be used. For example, one or both of the glass slides may be replaced with a series of reflective optics or an etalon, which may be under the control of a motorized translation or rotation stage.

Furthermore, in other embodiments, optics different from lenses 18 and 20 may be used to image diffracted beams 14 and 16 onto non-linear optical crystal 22. For example, curved reflective optics can be used, which may be advantageous for cases in which the glasses in lenses 18 and 20 introduce significant dispersion into beams 14 and 16, thereby stretching their pulse durations. In addition, reflective optics can be used to form a more compact, folded geometry. Also, in other embodiments, one or more lenses or reflective optics can be used to image the diffracted beams onto the crystal.

Other aspects, advantages, and modifications are within the scope of the following claims.

What is claimed is:

1. A method for autocorrelating an optical waveform comprising:

passing an input beam containing the optical waveform through a diffractive mask to form at least two sub-beams;

delaying one of the sub-beams relative to the other sub-beam; and imaging the two sub-beams onto a non-linear optical crystal to allow the two sub-beams to spatially overlap with one another, the diffractive mask defining the object plane and the non-linear optical crystal defining the image plane, the overlapping sub-beams being delayed relative to one another, and the non-linear optical crystal generating a signal beam in response to the overlapping sub-beams.

2. The method of claim 1 further comprising measuring the intensity of the signal beam.

3. The method of claim 2 further comprising repeating the measuring step for each of multiple delays between the sub-beams.

4. The method of claim 1 further comprising spectrally resolving the signal beam and measuring the intensity of the spectrally resolved signal beam.

5. The method of claim 4 further comprising repeating the resolving and measuring steps for each of multiple delays between the sub-beams.

6. The method of claim 1, wherein the non-linear optical crystal generates the signal beam by second harmonic generation.

7. The method of claim 1, wherein the delaying step comprises introducing material into a path of one of the sub-beams.

8. The method of claim 1, wherein the imaging step comprises passing the sub-beams through a pair of lenses.

9. The method of claim 1, wherein the optical waveform has temporal features shorter than 1 psec.

10. The method of claim 1, wherein the optical waveform has temporal features shorter than 300 fsec.

11. The method of claim 1, wherein the optical waveform is an optical pulse.

12. The method of claim 1, wherein the two sub-beams correspond to different orders of diffraction for the diffractive mask.

13. An optical autocorrelator for characterizing an an optical waveform, the autocorrelator comprising:

a diffractive mask which during operation diffracts an input beam carrying the optical waveform into at least two sub-beams;

an optical delay assembly positioned in the path of a first of the two sub-beams, wherein during operation the optical assembly introduces a variable delay between the two sub-beams;

a non-linear optical crystal;

an optical imaging system defining an object plane and an image plane and which during operation images the two sub-beams onto the non-linear optical crystal to allow the two sub-beams to spatially overlap one another, the diffractive mask being positioned in the object plane and the non-linear optical crystal being positioned in the image plane; and an analyzer which during operation measures an intensity of a signal beam produced by the non-linear optical crystal in response to the two overlapping sub-beams.

14. The autocorrelator of claim 13 further comprising a controller connected to the optical delay assembly and the analyzer, wherein during operation the controller causes the optical delay assembly to introduce multiple delays between the two sub-beams and records the intensity of the signal beam for each of the multiple delays.

15. The autocorrelator of claim 13, wherein the optical delay assembly comprises an optical window positioned in the path of the first sub-beam and a rotation stage supporting and adjustably orienting the optical window, the adjustable orientation of the optical window defining the variable delay between the two sub-beams.

16. The autocorrelator of claim 13, wherein the analyzer comprises a grating and a multi-element photodetector, wherein during operation the grating spectrally resolves the signal beam on the photodetector and the photodetector records the spectrally resolved intensity of the signal beam.

17. The autocorrelator of claim 13, wherein the analyzer is a photodetector.

18. The autocorrelator of claim 13, wherein the non-linear optical crystal generates the signal beam by second harmonic generation.

19. The autocorrelator of claim 13, wherein the optical imaging system comprises a pair of lenses and wherein the optical delay assembly is positioned between the pair of lenses.

20. The autocorrelator of claim 19, wherein each of the pair of lenses is a spherical lens.

21. The autocorrelator of claim 13 further comprising a stationary optical window positioned in the path of the second of the two sub-beams to impart a fixed delay to the second sub-beam.

22. The autocorrelator of claim 13, wherein the two sub-beams correspond to different orders of diffraction for the diffractive mask.

* * * * *